United States Patent [19]

Hurst et al.

[11] Patent Number: 4,721,346
[45] Date of Patent: Jan. 26, 1988

[54] HYDRAULIC ANTI-SKID BRAKING SYTEMS FOR VEHICLES

[75] Inventors: David C. Hurst; Alfred Yardley; Robert A. Anderson, all of West Midlands, England

[73] Assignee: Lucas Industries Public Limited Company, Great Britain

[21] Appl. No.: 707,440

[22] Filed: Mar. 1, 1985

[30] Foreign Application Priority Data

Mar. 7, 1984 [GB] United Kingdom ................. 8405903
Jul. 2, 1984 [GB] United Kingdom ................. 8416801

[51] Int. Cl.⁴ ............................ B60T 8/42; B60T 8/48
[52] U.S. Cl. ................................ 303/115; 188/181 A; 303/117
[58] Field of Search ............... 303/113, 115, 116, 117, 303/10, 61, 68, 119; 188/181 A, 181 R

[56] References Cited

U.S. PATENT DOCUMENTS

| | | | |
|---|---|---|---|
| 3,843,211 | 10/1974 | Ingram et al. | 303/115 |
| 3,918,768 | 11/1975 | Farr | 303/113 |
| 4,422,695 | 12/1983 | Farr | 303/115 |
| 4,457,563 | 7/1984 | Farr | 303/115 X |

FOREIGN PATENT DOCUMENTS

| | | | |
|---|---|---|---|
| 1295424 | 11/1972 | United Kingdom . | |
| 1386713 | 12/1975 | United Kingdom . | |
| 2029914 | 3/1980 | United Kingdom | 303/116 |
| 2069640 | 8/1981 | United Kingdom | 303/116 |
| 2109492 | 6/1983 | United Kingdom | 303/115 |

Primary Examiner—Andres Kashnikow
Assistant Examiner—Robert J. Oberleitner
Attorney, Agent, or Firm—Laff, Whitesel, Conte & Saret

[57] ABSTRACT

In an hydraulic anti-skid braking system of the pump and de-boost type the position of the de-boost piston in the bore is determined by a volume of fluid trapped in a space by a dump valve. The dump valve operates in conjunction with a restrictor which, at least at pressures above a pre-set level, restricts the rate of release of fluid from the space when the dump valve is open. Decreasing the flow rate of the dump valve decreases the time period for each anti-skid cycle. The pump no longer has to pressurize to maximum (brake) from zero which reduces the amount of energy which otherwise would have been consumed in the re-application mode. In addition the rate of release of fluid at pressures below the pre-set level can be increased which is of particular advantage when the vehicle is travelling over surfaces having low co-efficients of friction.

13 Claims, 11 Drawing Figures

HYDRAULIC ANTI-SKID BRAKING SYTEMS FOR VEHICLES

This invention relates to hydraulic anti-skid braking systems for vehicles of the kind set forth in which a supply of operating fluid from a supply to a vehicle brake is modulated by a modulator assembly in accordance with skid signals from skid sensing means, and a power source is incorporated to control brake reapplication following skid correction.

In the anti-skid braking systems described in GB-A-2029914 and GB-A-2069640 the modulator assembly comprises a bore in which works a de-boost piston for co-operation with a control valve assembly adapted to control communication between the supply of operating fluid and the brake through an expansion chamber defined in the bore between the piston and the control valve assembly. Normally the piston is held in an inoperative advanced position by a trapped volume of fluid supplied by the pump and, in this position, the valve assembly is fully open and the effective volume of the expansion chamber is at a minimum. When a skid signal is produced a dump valve is operated so that the trapped volume of fluid is released which permits the piston to move into a retracted position, initially to permit the valve assembly to close and isolate the supply from the brake, and subsequently to increase further the effective volume of the expansion chamber, whereby to relieve the brake-applying pressure. Following correction of the skid and closure of the dump valve, the pressure from a pump constituting the power source is operative to urge the piston towards its advanced position, initially to re-apply the brake by pressurising the fluid in the expansion chamber, and subsequently opening the valve assembly to re-establish communication between the supply and the brake.

In the system described in GB-A-2029914 and GB-A-2069640 the dump valve is movable between a fully open and a fully closed position to release the trapped volume of fluid, or to close the space so that fluid can become trapped therein again in order to permit the piston to return to its operative advanced position. The pressure in the space is normally the same as the pressure applied to the brake.

In the event of a high speed stop, or any other event which results in heavy braking, the brake pressure can reach high levels, for example 1500–1800 p.s.i. Without any form of dump control other than the dump valve itself, when the braked wheel started to slip at the high brake pressure, the trapped volume of fluid is released so that brake pressure dives to a minimum. This is undesirable since difficulty may be experienced in re-applying the brakes at a desired pressure due to the capacity of the power source and in the necessarily limited time period.

According to our invention in an anti-skid hydraulic braking system of the kind set forth in which the modulator assembly comprises a bore in which works a de-boost piston for co-operation with a control valve assembly adapted to control communication between the supply of operating fluid and the brake, and the position of the de-boost piston is determined by a volume of fluid trapped in a space by a dump valve and provided by the power source, restrictor means being incorporated for reducing the rate at which fluid is released from the brake when the dump valve opens in response to a skid signal, at least at pressures above a pre-set level.

The provision of the restrictor means which decrease the dump flow rate at pressure, above the pre-set level thereby reduces the time period for each anti-skid cycle. The power source no longer has to pressurise brake to maximum (brake) pressure from zero, but only from some intermediate pressure.

This therefore reduces the amount of energy which otherwise would have been consumed in the re-application mode.

When the restrictor means is inoperative at pressures below the pre-set level the rate at which pressure can be dumped from the brake can, with advantage, be increased in comparison with known dump valves which restrict to a lesser extent, the rate at which fluid is dumped, by increasing the area or capacity of the dump valve itself. This is of particular advantage when the vehicle is travelling over surfaces of lower co-efficient of friction since brake pressure can be released more rapidly than hitherto.

By decreasing the dump flow rate at pressures above the pre-set level, and by increasing the dump flow rate at pressures below the pre-set level enables us to increase the anti-lock frequency of the system.

The restrictor means may comprise a restrictor which is adapted to restrict the release of fluid from the brake itself at pressures above the pre-set level when the dump valve is opened.

Alternatively the restrictor means may be arranged to restrict the release of fluid trapped in the said space by the dump valve at pressures above the pre-set level.

In such a construction the output from the power source, suitably a pump, may be connected either to the upstream or the downstream side of the restrictor means. When it is connected to the downstream stream side of the restrictor means, the action of the restrictor means is independent of wheel speed velocity.

The restrictor means may be incorporated in the modulator assembly itself, or it may be separate from it and connected to it by an external connection.

The restrictor means preferably comprises a pressure-responsive member, suitably a spool or piston, which is movable in a bore to bring into operation means for reducing the rate at which fluid is released from the brake.

When the pressure-responsive means comprises a spool, a land on the spool is biassed into a throat to restrict the release of fluid from the brakes.

When the pressure-responsive means comprises a piston, the piston is adapted to operate a valve member, which is movable in a direction to restrict the area of a passage or, alternatively, engage with a seating whereafter restricted flow takes place through a restricted passage through the seating or through the valve member itself.

The spool or the piston may work in a bore in a spool which is itself manually displaceable in a bore in the housing against the spring loading the de-boost piston into its advanced position, in order to affect bleeding of the system.

Some embodiments of our invention is illustrated in the accompanying drawings in which.

Figure 1:
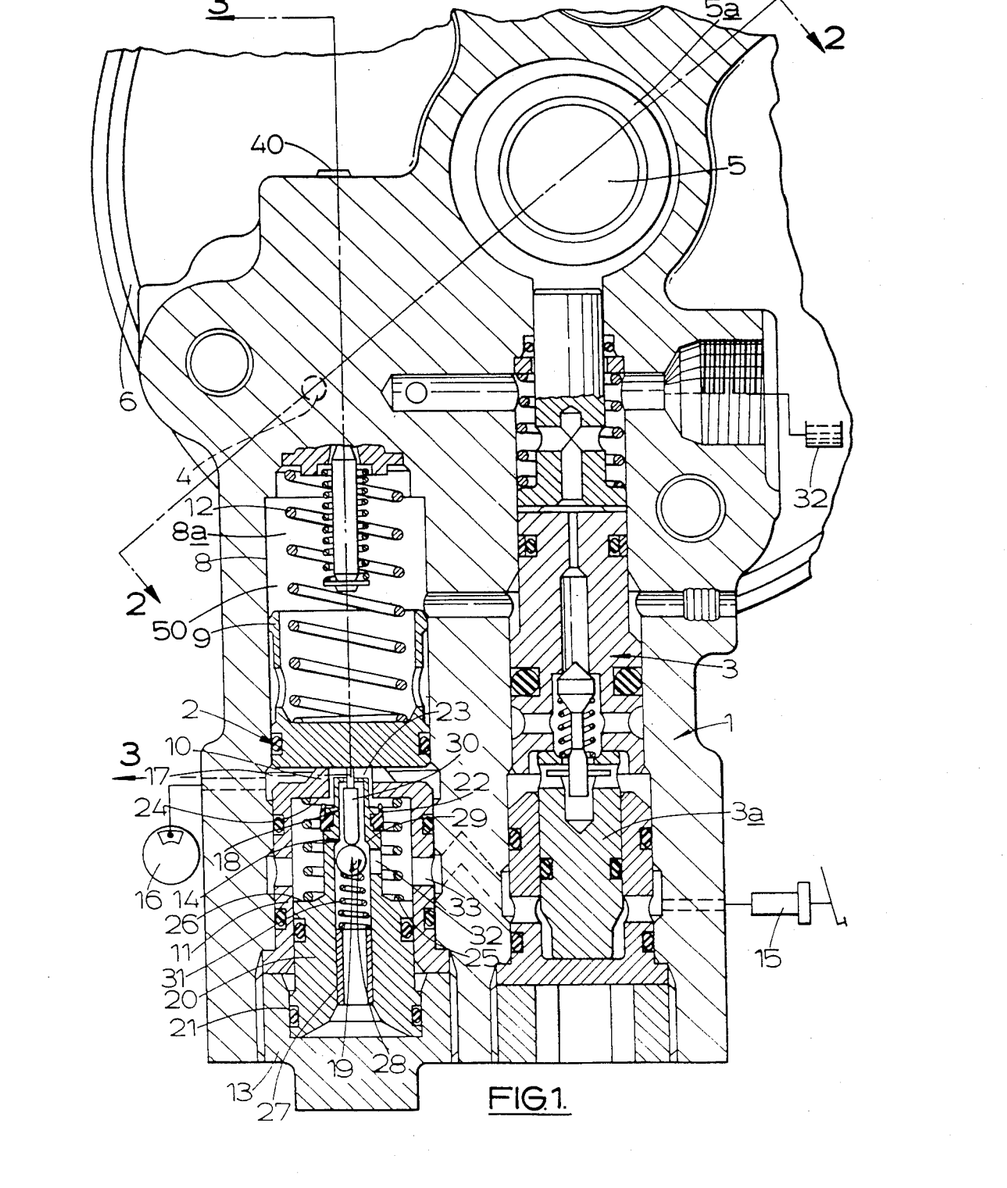
FIG. 1 is a transverse section through a combined modulator and skid sensing assembly for an hydraulic anti-skid braking system suitable for a motor-cycle or light passenger car or van.
Figure 2:
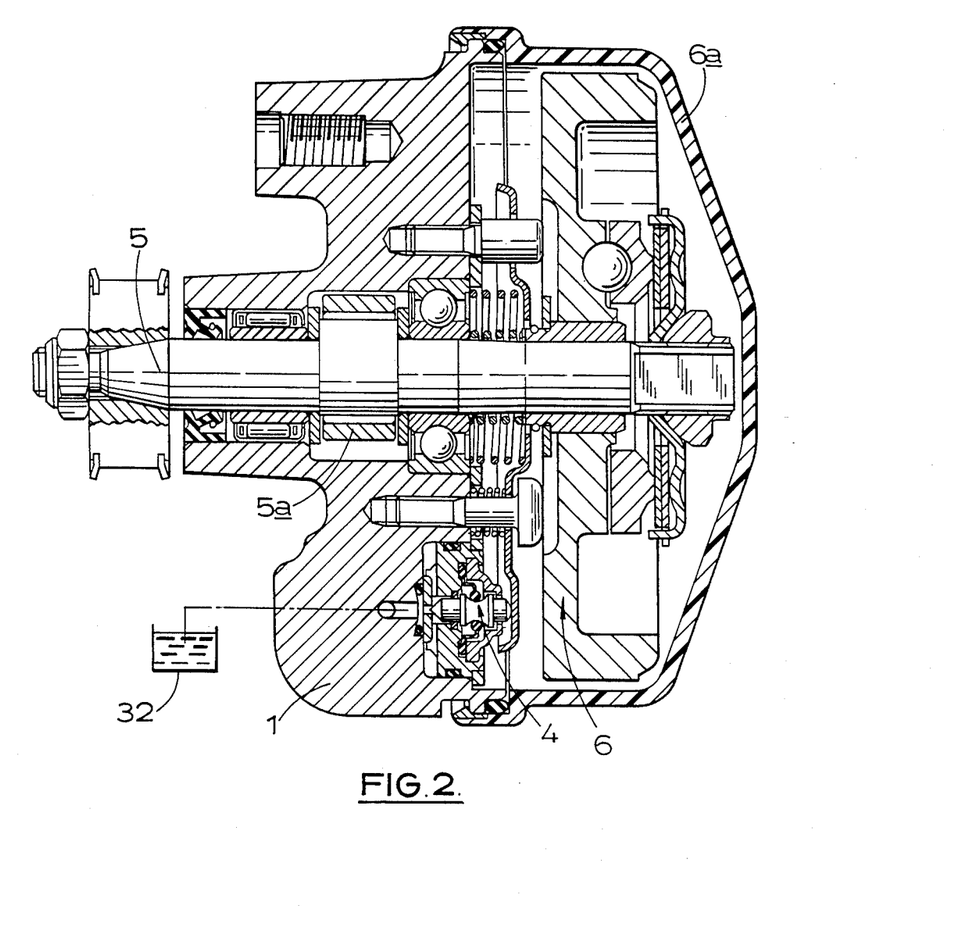
FIG. 2 is a section on the line 2—2 of FIG. 1.

The assembly illustrated in the drawing comprises a housing 1 incorporating a modulator assembly 2, a hydraulic pump assembly 3, and a pressure dump valve 4. A longitudinally extending shaft 5 projecting at opposite ends through the housing 1 is coupled at one end to a wheel to be braked and at the other end carries skid sensing means 6 which is enclosed within a cylindrical guard 6a carried from an adjacent end of the housing.

The dump valve 4 and the skid sensing means 6 may be of any of the forms disclosed in GB-A-2029914, and the pump assembly 3 forms the subject of GB-A-2069640. These latter mechanisms need not be described further herein except to mention that the pump 3 is urged in one direction by an eccentric 5a on the shaft 5 and in the opposite direction by pressure from the master cylinder acting over an operating piston 3a. The area or capacity of the dump valve 4 is increased and the dump valve 4 operates in conjunction with a resistor 40 which will be described later.

The modulator assembly 2 comprises a bore 8 extending from the dump valve 4 and in which works a de-boost piston 9, 9'. The piston 9, 9' is normally urged into an inoperative position against a stop comprising a wall 10 at the closed end of a sleeve 11 substantially of cup-shaped outline by means of a spring 12, and the sleeve 11 is retained in the bore 8 by means of a closure 13 for the end of the bore 8 remote from the dump valve 4.

A control valve assembly 14 housed in the sleeve 11 controls communication between a pedal-operated master cylinder 15 and a wheel brake 16 through an expansion chamber 17 defined in the bore 8 between the piston 9 and the control valve assembly 14.

The control valve assembly 14 comprises a first valve 18, and a second valve 19 which are operative sequentially.

The first valve 18 comprises a first valve member 20 in the form of a stepped piston having a portion of intermediate diameter working in the bore of the sleeve 11, an outer portion of largest diameter working in a blind bore 21 of the closure 13, an inner portion of smaller diameter carrying an annular seal 22 which defines a valve head, and an innermost portion of smallest diameter which projects into a circular opening 23 in the wall 10. The valve head 22 is engageable with a seating 24 comprising an annulus on the wall 10 which surrounds the opening. Normally the head 22 is spaced from the seating 24 by means of a spring 25 which acts between the wall 10 and a shoulder 26 at the step in diameter between the intermediate and the smaller diameter portions of the piston 20.

The piston 20 has an open-ended longitudinally extending bore 27 of stepped outline in which the second valve 19 is housed. The second valve 19 comprises a valve member 28 in the form of a ball which is engageable with a seating 29 defined by a shoulder at the step in diameter of the bore 27. The ball 28 is normally urged away from the seating 29 by a probe 30 with which the piston 9 co-operates against the force in a light compression spring 31.

In the normal inoperative position shown in the drawing the dump valve 4 is closed to isolate the support chamber 50 in the portion of the bore 8 above the piston 9, 9' from a reservoir 32 for fluid. The piston 9, 9' is therefore held in an inoperative advanced position in which the second valve 19 is held open by the probe 30, and the first valve is held open by the spring 25.

When the brake is to be applied by operation of the master cylinder 15, a hydraulic fluid is supplied to the brake 16 through radial ports 33 in the wall of the sleeve 11, and through the open first valve 18 to the expansion chamber 17. Simultaneously fluid also enters the through-bore 27 through a port 32 in the wall of the piston 20 and can pass to the expansion chamber 17 through the open second valve 19. Thus there is a substantially unrestricted flow of fluid to the brake.

Fluid from the master cylinder acts on the shoulder 26 at the step in diameter, over the valve head 22, and over the outer end of the piston 20 which is of greatest area. The unrestricted communication continues until the pressure from the master cylinder attains a predetermined value such that the force acting on the piston 20 due to the pressure acting over the end of greatest area overcomes the force in the spring 25 plus the force due to that pressure acting over the shoulder 26 and the head 22. The first valve 18 then closes, and any further pressure increase can only take place at a reduced rate by flow through a restricted path comprising the clearance between the valve member 28 and the seating 29.

When a skid signal is received the skid sensing means 6 is operative to open the dump valve 4 which releases the volume of fluid trapped in the chamber 50 of the bore 8 so that the piston 9, 9' can retract against the force in the spring 12 initially to allow the second valve 19 to close since the pressure at which a skid signal can be emitted is higher than that at which the first valve 18 will have closed. This cuts-off communication between the master cylinder 15 and the brake 16, and the retraction of the piston 9, 9' continues to increase the effective volume of the expansion chamber 17, whereby to relieve the pressure applied to the brake 16.

Opening the dump valve 4 also unbalances the pump 3 causing it to pump fluid in a closed circuit into the chamber 50 from the reservoir 32 to which it is returned, through the open dump valve 4. Since communication between the piston 3a and the master cylinder 15 is unrestricted, the pump 3 can move freely.

At the termination of the skid signal the dump valve 4 closes to isolate the bore 8 from the reservoir 32 and the pump 3 is then operative to increase the pressure in the chamber 50, with the result that the piston 9, 9' is urged towards its inoperative, advanced, position. Initial movement of the piston 9, 9' in this direction re-applies the brake 16 by pressurising the volume of fluid trapped in the expansion chamber 17, and subsequent movement opens the second valve 19 to establish a restricted flow from the master cylinder to the expansion chamber 17 through the clearance between the ball 28 and the seating 29. Thus the first valve 18 closes at a predetermined pressure independent of the movement of the piston 9, 9'. The second valve 19 is closed and opened by movement of the piston 9, 9' away from and towards its stop 10 on the sleeve 11. When the pressure from the master cylinder 15 is reduced below a predetermined value, the first valve 18 re-opens to provide a free and unrestricted communication between the master cylinder 15 and the brake 16.

Figures 3, 4:
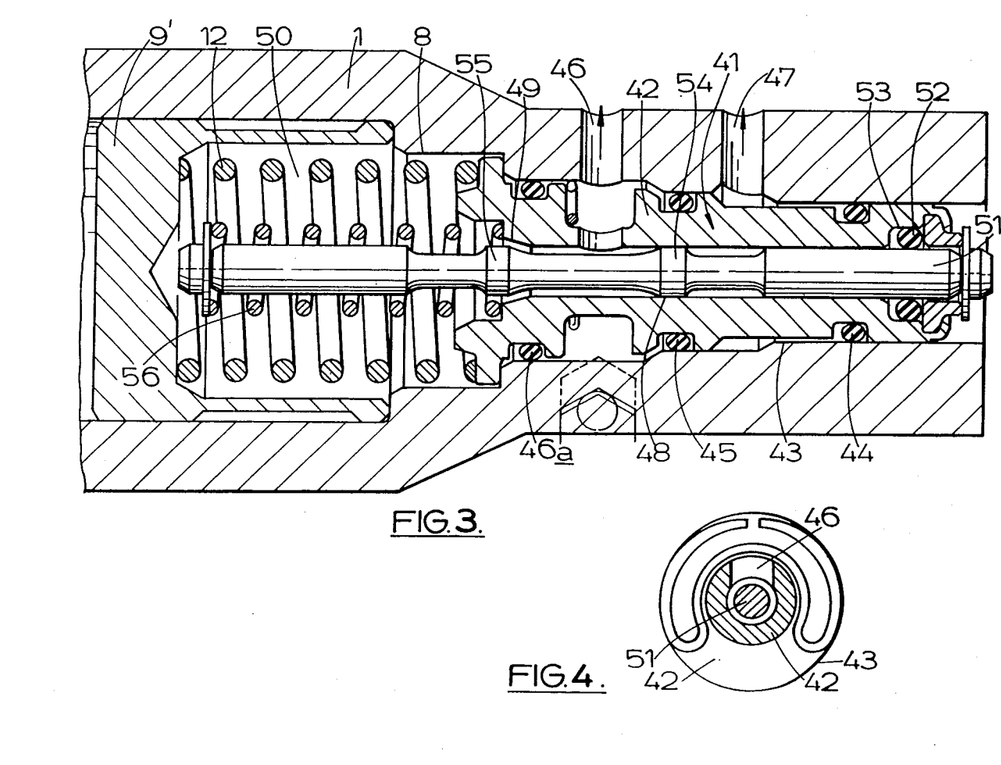
FIG. 3 is a section on the line 3—3 of FIG. 1.
FIG. 4 is a transverse section through FIG. 3 showing a view of a spring retainer.

The dump valve 4 operates in conjunction with the restrictor 40 shown in detail in FIGS. 3 and 4 of the drawings, and the restrictor 40 is combined with a bleed device 41.

As illustrated an outer spool 42 works in a stepped bore 43 in the housing 1 and carries three axially spaced seals 44, 45 and 46a in three portion of progressively increased diameters. The seals 44 and 46a seal at all times with the corresponding portions of the bore 43, and the seal 45 is movable between the position shown in which it seals against the intermediate portion of the bore to isolate a passage 46 leading to the pump 3 from a passage 47 to atmosphere, and a position within the portion of the bore 43 which is a greatest diameter in order to place the two passages 46 and 47 in communication. Normally the spool 42 is urged into the position shown by the spring 12.

The spool 42 has an axial through-bore 48 terminating at its inner end in a throat 49 of frusto-conical outline of which the diameter increases towards a space 50 within the bore 8.

An inner spool 51 works through the bore 48 and at its outer end works through a seal 52 received in a recess 53 at the outer end of the outer spool 42. The spool 51 incorporates spaced lands 54 and 55 of which the land 54 is guided in the bore 48 at all times. A spring 56 acts between the inner ends of the two spools 42 and 51 normally to urge the inner spool 51 in a direction in which the land 55 is spaced from the outer end of the throat 49. This provides unrestricted communication between the space 50 and the passage 46 leading to the dump valve 4.

Under normal braking, the dump valve 4 is closed and maintains the volume of support fluid in the space 50 to hold the piston 9, 9' in its advanced position. The pressure in the space 50 is the same as that applied to the brake.

In the event of a high-speed stop, or any other event which results in heavy-braking, the brake pressure can reach high levels, e.g. 1500–1800 p.s.i. Without any form of dump control other than the dump valve 4 itself, when the braked wheel starts to slip at the high brake pressure, the fluid would be released from the space 50 so that the pressure would dive to the minimum. However, with the spool 51 incorporated, prior to wheel slip, the prevailing brake pressure has already acted on the spool 51 over the area defined by seal 52 so that at a pre-set level of say 500–600 p.s.i., the pressure force on the spool 51 overcomes the static load in the spring 56 which enables the spool 51 to move relatively away from the piston 9. This brings the land 55 into the throat 49. The resultant annular clearance provides only a very limited dump outlet flow, although the dump valve 4 is itself fully open.

At pressures above the pre-set level the decreased dump flow rate therefore reduces the time period for each anti-skid cycle, and the pump 3 no longer has to pressurise back to a maximum (brake) pressure from zero, but only from some intermediate pressure e.g. 500 p.s.i.

Figure 5:
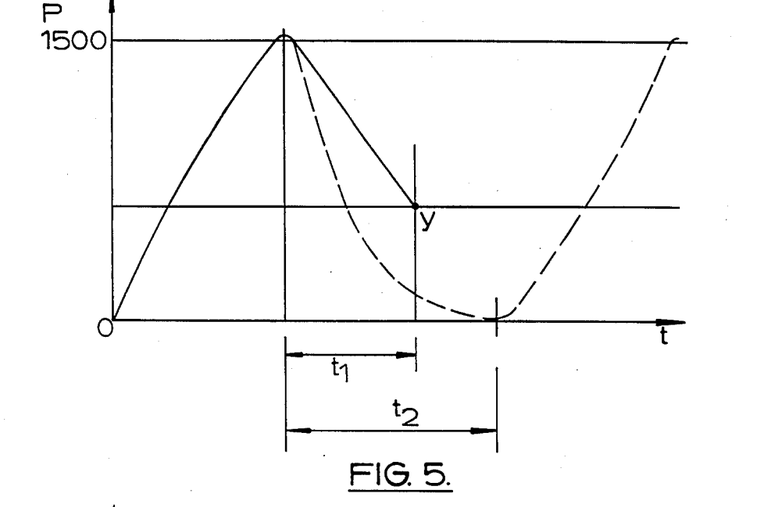
FIG. 5 is a graph of a brake pressure plotted against time for a vehicle travelling over a surface having a high co-efficient of friction ($\mu$)
Figure 6:
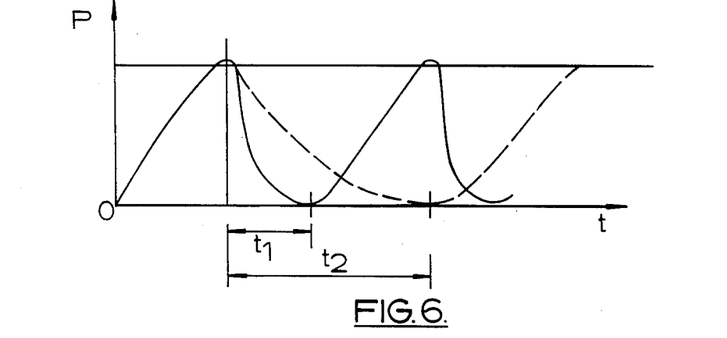
FIG. 6 is a graph similar to FIG. 5 but for a vehicle travelling over a surface having a poor or low co-efficient of friction ($\mu$)

These effects are illustrated in the graphs of FIGS. 5 and 6 in which the behaviour of a braked wheel with the dump control operative is shown in solid lines, and the behaviour with the restrictor 40 inoperative and utilising a standard dump valve is shown in broken lines.

As shown in FIG. 5, when the vehicle is travelling over a surface of high $\mu$ and a skid occurs at a pressure substantially in excess of the pre-set level, with the restrictor 40 operative the brake pressure in time '$t_1$' is reduced to a value at point 'y' at which the wheel is able to rotate again, whereafter the pump 3 is operative to re-apply the brake as described above. The slope of the graph to point 'y' is considerably shallower than that of the corresponding part of the graph had the restrictor 40 been inoperative and from which it will be seen that in the time interval '$t_1$' the brake pressure would have reduced at a greater rate, finally reaching zero pressure after time interval '$t_2$'.

This cuts the amount of energy consumed in the re-application mode, and because the time base has been decreased per cycle from '$t_2$' to '$t_1$' the anti-skid cycle efficiency is thus improved by increasing the total area under the curve.

Since the provision of the restrictor 40 enables us to increase the area or capacity of the dump valve 4, release of brake pressures at values lower than the pre-set level can occur more rapidly than hitherto.

As shown in FIG. 6 with the vehicle travelling over a surface of low $\mu$, the skid occurs at a pressure below the pre-set level. Thus the restrictor 40 is inoperative with the result that the brake pressure is reduced rapidly to zero, and at a greater rate than that achieved hitherto with conventional dump valves.

To affect bleeding of the system the spool 42 is displaced axially in the bore 43 by a manual force applied to its outer end against the load in the spring 12, and the seal 45 disengages from the intermediate portion of the bore 43. The two passages 46 and 47, and chamber 50 are thus placed in communication for bleeding to take place.

When the manual force is released, the spool 42 is returned to the position shown in the drawings with the seal isolating passage 46 from passage 47.

Figure 7:
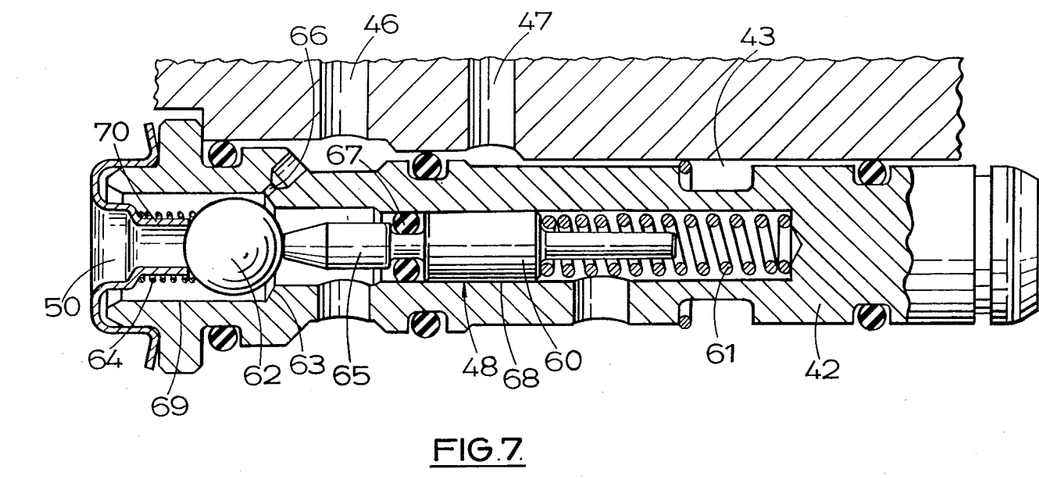
FIG. 7 is a section similar to FIG. 3 showing a modified restrictor.

In the construction of FIG. 7 the spool 51 has been replaced by a pressure reaction piston 60 which works in the bore 48 of the outer spool 42. A spring 61 acts on the piston 60 normally to bias it in a direction to urge a valve member 62 in the form of a ball away from a seating 63 at a step in diameter of the bore 48 between bore portions 68 and 69. A light spring 64 acts to bias the ball 62 at all times against a probe 65 projecting forwardly from the piston 60. A restricted orifice 66 in the spool 42 provides restricted communication between the chamber 50 and the passage 46 when the ball 62 is in communication with the seating 63.

When the chamber 50 is pressurised to hold the piston 9 in its advanced position, that pressure acting on the piston 60 over the area of a seal 67 is insufficient to overcome the load in the spring 61, and the ball 62 rests against a stop 70. However, as in the previous embodiment, during heavy braking, when the brake-pressure exceeds the pre-set level of 500–600 p.s.i., the pressure force on the seal 67 overcomes the static load in the spring 61 and the piston 60 moves relatively away from the piston 9. This permits the ball 62 to engage with the seating 63, and fluid is then dumped from the chamber 50 at a rate determined by flow through the orifice 66.

The construction and operation of the restrictor 40 of FIG. 7 is otherwise the same as that of FIGS. 1-4 and corresponding reference numerals have been applied to corresponding parts.

Figure 8:
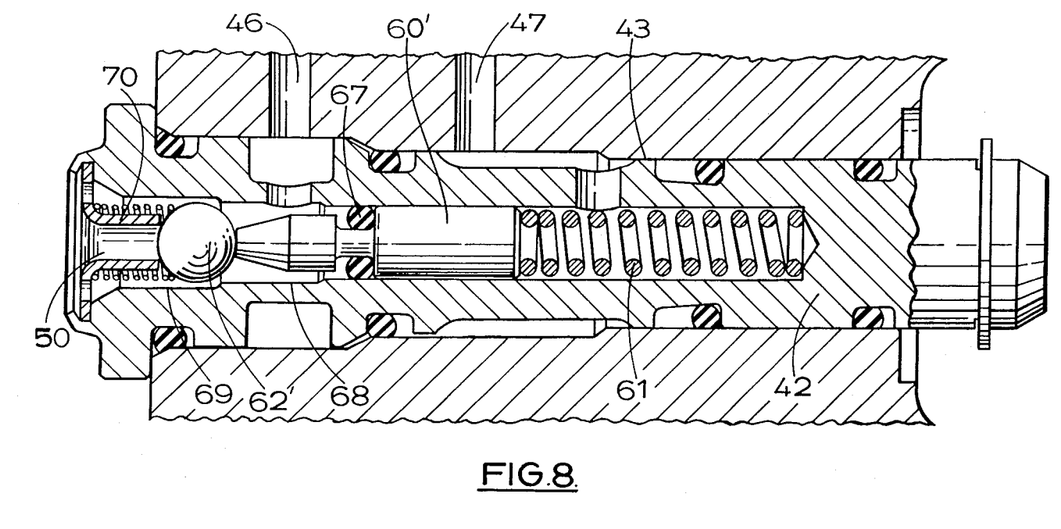
FIG. 8 is a section similar to FIG. 7 but showing a modified construction.

In the construction of FIG. 8 the orifice 66 is omitted together with the seating 63, and the ball 62 is of a diameter slightly smaller than the diameter of the bore portion 68.

Thus, when the static load in the spring 61 is overcome and the piston 60' moves relatively away from the piston 9, the ball 62' moves into the bore portion 68 to define an annular restricted return passage to the reservoir 32 through the open dump valve 4.

The construction and operation of the restrictor 40 of FIG. 8 is otherwise the same as FIG. 6 and corresponding reference numerals have been applied to corresponding parts.

Figure 9:
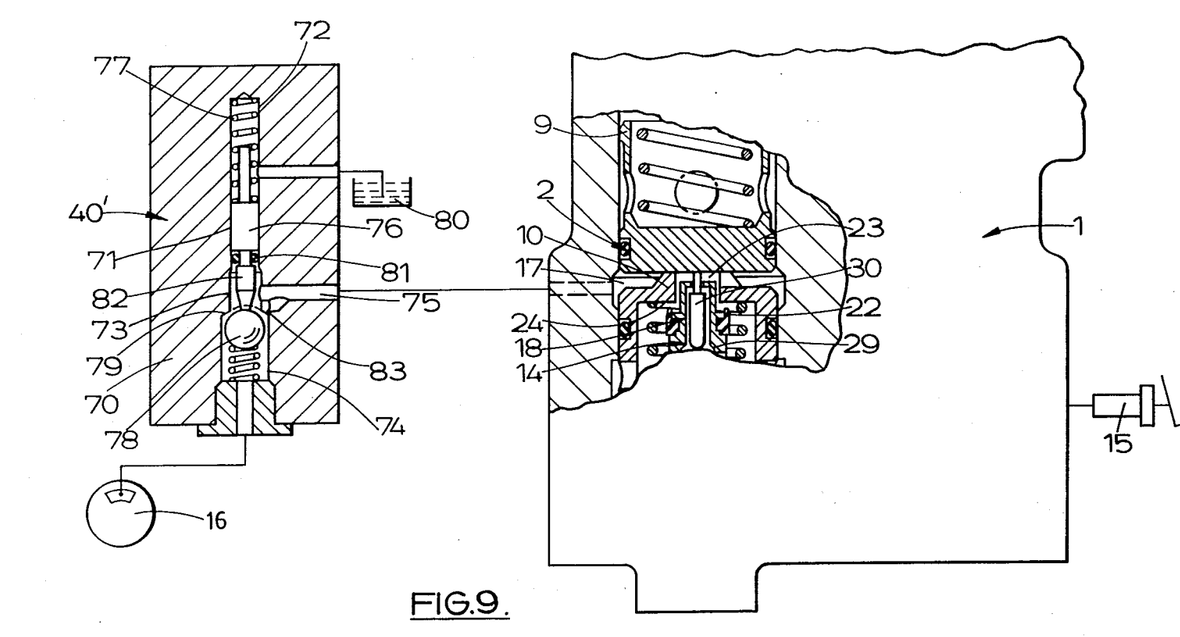
FIG. 9 is a layout of another braking system.

In the braking system illustrated in FIG. 9 of the drawings the restrictor 40' is separate from the housing 1 and is located in the line between the expansion chamber 17 and the brake.

The restrictor 40' comprises a housing 70 provided with a longitudinally extending stepped blind bore 71 which is closed at its inner end of smallest diameter. The bore 71 has three portions of smallest, intermediate and greatest diameters 72, 73, 74. The outer end of the portion 74 of greatest diameter is connected to the brake, and a radial port 75 in the wall of the housing 70 and leading into the bore portion 73 is connected to the chamber 17.

A piston 76 working in the bore portion 73 is radially biassed by a spring 77 in a direction to hold a valve member in the form of a ball 78 away from a seating 79 at the step in diameter, between the bore portions 73 and 74. The bore portion 71 at the inner end of the piston 76 is connected to a reservoir 80 to collect fluid which may leak past a seal 81 at the inner end of the piston 76 and received in a groove at the inner end of a probe 82 through which the piston acts on the ball 78.

When the ball 78 engages with the seating 79, a restricted orifice 83 provides a limited flow between the brake 16 and the chamber 17.

As in the preceeding embodiment, when the brake-pressure in the chamber 17 attains the pre-set level of 500-600 p.s.i. and the dump valve 4 opens as described above, the pressure force on the seal 81 due to the pressure of the brake 16 overcomes the static load in the spring 77 and the piston 76 moves against the spring 77 to permit the ball 78 to engage with the seating. Thereafter fluid is returned from the brake 16 to the expansion chamber 17 at a rate determined by flow through the orifice 83.

Figure 10:
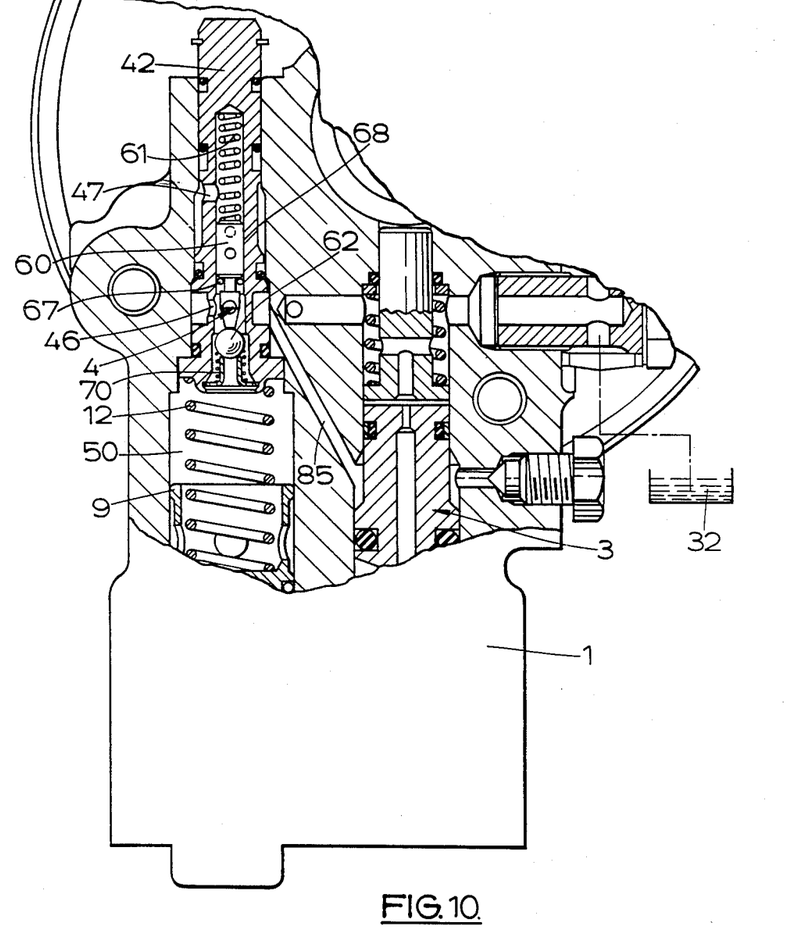
FIG. 10 is a section of the modulator assembly incorporated in the layout of FIG. 1 but showing a modification.

The modulator assembly illustrated in FIG. 10 of the drawings shows a modification of the restrictor 40 of FIG. 8, in which the output from the pump 3 is connected to the downstream side of the restrictor 40 through a passage 85 and not through the chamber 50. Thus the action of the restrictor 40 does not depend upon wheel speed velocity.

The construction and operation of the modulator assembly of FIG. 10 is otherwise the same as that of FIG. 8 and corresponding reference numerals have been applied to corresponding parts.

Figure 11:
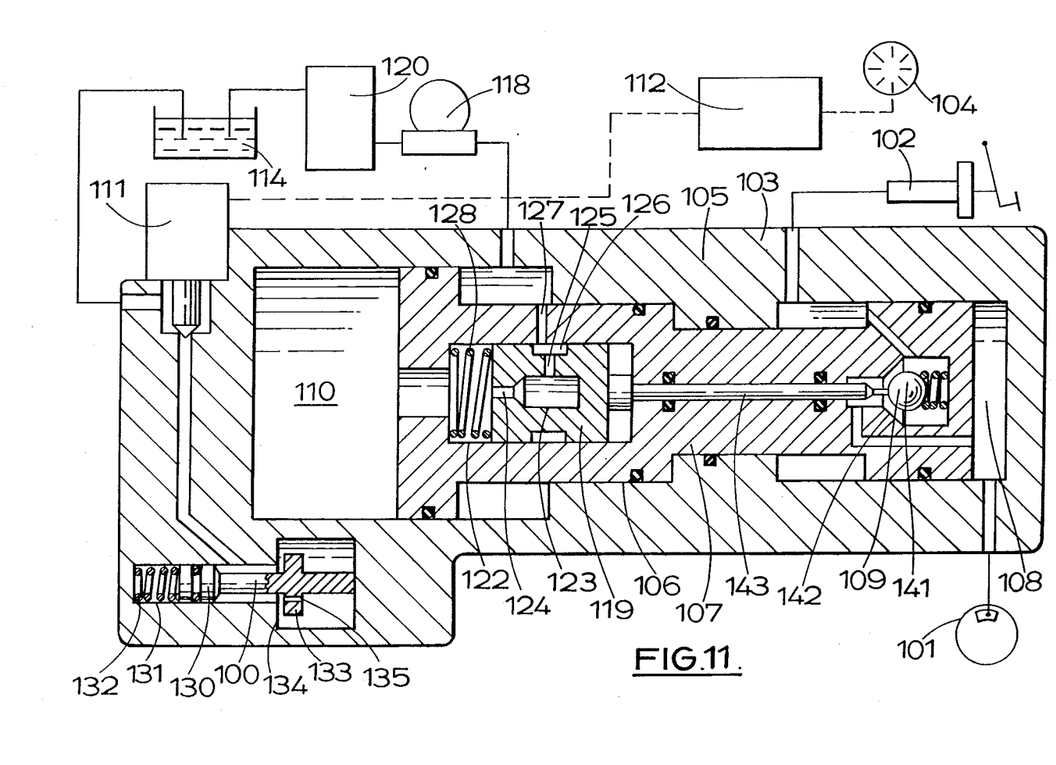
FIG. 11 is a layout of yet another braking system.

A layout of a further anti-skid braking system is shown in FIG. 11 of the drawings. In this system a wheel brake 101 is adapted to be applied by a pedal-operated master cylinder 102 through a modulator assembly 103 which is responsive to skid signals from a sensor 104 for sensing the speed of rotation of the wheel braked by brake 101.

The modulator assembly 103 comprises a housing 105 having a stepped longitudinally extending bore 106 in which works a stepped de-boost piston 107, an expander chamber 108 defined in the bore 106 between the end of the piston 107 which is of smaller area and a first valve 109 for controlling communication from the master cylinder 102 to the brake 1 through the expander chamber 108, and a support chamber 110 defined in the bore 106 between the opposite end of the piston 107 and a solenoid-operated valve 111 which communicates with the support chamber 110 through a restrictor valve 100. The solenoid operated valve 111 is controlled by electrical signals from an electronic control module 112, in turn responsive to signals from the sensor.

The system is provided with a power source constituted by an accumulator 118 which is charged by a pump 120 which, in turn, draws fluid from a reservoir 114 which is separate from the pump 120.

Fluid from the accumulator 118 is supplied to the support chamber 111 through a flow-control regulating valve 119 comprising a spool 121 which works in a bore 122 in the piston 107 and is provided with a blind bore 123 terminating at its inner end adjacent to the support chamber 110 in a fixed orifice 124. A diametrical passage 125 traverses the bore 123 and its outer ends lead into an annular groove 126 which co-operates with a radial port 127 leading from the accumulator 118 to constitute a variable restrictor. In the position shown in the drawing the spool 121 is held by a spring 128 in a position of maximum flow. In this position a ball comprising a valve member 141 is held away from a seating 142 by an axially extending stem 143 which slides through the piston 107. The valve member 141 and the seating 142 constitutes the valve 109.

The restrictor valve 100 comprises a piston 130 working in a bore 131 and normally urged by a spring 132 in a direction to hold an enlarged head 133 away from a seating 134. The seating 134 comprises a shoulder in the housing 105 at the inner end of the bore 131. The head 133 is provided with a restricted orifice 134 which provides a limited flow through the head 133 when the head 133 is in engagement with the seating 134.

In the position shown in the drawing the valve 111 is closed and the valve 109 is open to allow the brake 101 to be applied normally from the master cylinder and with the de-boost piston 107 held in the advanced position by equal pressures from the accumulator 118 acting over portions of the piston 107 of different areas at opposite ends of the orifice 124, with the pressure from the actuator being supplied through the flow control regulating valve 119, to the chamber 110.

When a skid signal is generated the solenoid-operated valve 111 opens to place the support chamber 110 in communication with the reservoir 114. Due to a pressure drop across the fixed orifice 124, the spool 121 moves rapidly away from its retracted position, to cause the valve member 141 to engage with the seating 142 and isolate the master cylinder 102 from the brake 101.

The loss of pressure in the support chamber 110 permits the de-boost piston 107 to retract, thereby relieving the brake-applying pressure.

At the termination of the skid signal when the valve 111 closes to isolate the support chamber 110 from the reservoir 114 and fluid from the accumulator 118 returns the de-boost piston 107 at a rate determined by the flow-control regulating valve 119 in accordance with the pressure drop across the orifice 124 and the load in the spring 128, to force the piston 107 to return the advanced position and re-apply the brake 101. The valve member 141 remains in engagement with the seating 142 since the spool 121 is still in the advanced position.

When the piston 107 reaches its advanced position the flow of fluid through the flow-control regulator valve 119 ceases, equalising the pressure at opposite ends of the spool 121 which then moves back into its retracted position due to the load in the spring 128, thus re-opening the valve 140 to re-establish communication between the master cylinder 102 and the brake 101 through the expander chamber 108.

Should the accumulator 118 fail during a skid cycle the pressure across the flow-control regulating valve 119 will equalise and the valve 140 will open. This will allow the brake pressure to rise and re-apply the brake 101 irrespective of the position of the de-boost piston 107 in the bore 106. Such an increase in brake pressure will not move the de-boost piston 107 due to the provision of a one-way valve (not shown) at the outlet from the accumulator 118.

The flow through the flow-control regulating valve 119 is determined by the force in the spring 128 and this force, divided by the area of the spool 121, determines the pressure drop across the orifice 124.

As in the preceding construction, when the solenoid-operated valve 111 opens at pressure above the pre-set level of 500–600 p.s.i., the piston 130 moves axially into the bore 131 to cause the head 133 to engage with the seating 134. Thereafter the rate of release of fluid from the support chamber 110 is determined by the rate of flow through the orifice 134.

We claim:

1. An hydraulic anti-skid braking system for vehicles comprising a vehicle brake, a supply for operating fluid for applying said brake, skid sensing means for sensing the presence of skid conditions at said wheel during braking and thereupon to produce skid signals, a modulator assembly for modulating the supply of fluid from said supply to said brake in accordance with said skid signals, and a power source for controlling brake re-application following correction of said skid, wherein said modulator assembly comprises a housing having a bore, a de-boost piston working in said bore and movable between an advanced inoperative position and a retracted position, a control valve assembly with which said de-boost piston is adapted to co-operate and which is adapted to control communication between said brake and said supply, said control valve assembly being movable between an open position when said de-boost piston is in said advanced position and a closed position when said de-boost piston is in said retracted position, means defining a space in said bore in which fluid from said power source is adapted to be trapped to hold said de-boost piston in said inoperative advanced position, and a dump valve for maintaining said trapped volume of fluid in said space, said dump valve being movable in response to a skid signal from an normally closed position in which fluid is trapped in said space into an open position in which fluid is dumped from said space, and fluid is released from said brake at a first rate for pressures below a pre-set level, and restrictor means additional to said dump valve are incorporated for controlling the release of fluid from said brake at a second rate lower than said first rate for pressures above said pre-set level, said restrictor means comprising means defining a restrictor for determining said second rate, and a pressure-responsive member operable in response to pressures above said pre-set level to bring said restrictor into operation to determine said second rate of fluid release, whereby upon operation of said dump valve fluid is released from said brake only at said second rate for all pressures above said pre-set level.

2. A braking system as claimed in claim 1, wherein said restrictor is adapted to restrict the release of fluid from said brake itself at pressures above said pre-set level, when said dump valve moves into said open position.

3. A braking system as claimed in claim 1, wherein said restrictor is arranged to restrict the release of fluid trapped in the said space by said dump valve at pressures above the said pre-set level.

4. A braking system as claimed in claim 3, wherein an output from said power source is connected to the upstream side of said restrictor means.

5. A braking system as claimed in claim 3, wherein an output from said power source is connected to the downstream side of said restrictor means.

6. A braking system as claimed in claim 1, wherein said restrictor means is incorporated in said modulator assembly itself.

7. A braking system as claimed in claim 1, wherein said restrictor means is separate from said modulator assembly itself and is connected to it through an external connection.

8. A braking system as claimed in claim 1, wherein said pressure-responsive member is movable in a bore to bring said restrictor into operation by said pressure-responsive member.

9. An hydraulic anti-skid braking system for vehicles comprising a vehicle brake, a supply for operating fluid for applying said brake, skid sensing means for sensing the presence of skid conditions at said wheel during braking and thereupon to produce skid signals, a modulator assembly for modulating the supply of fluid from said supply to said brake in accordance with said skid signals, and a power source for controlling brake re-application following correction of said skid, wherein said modulator assembly comprises a housing having a bore, a de-boost piston working in said bore and movable between an advanced inoperative position and a retracted position, a control valve assembly with which said de-boost piston is adapted to co-operate and which is adapted to control communication between said brake and said supply, said control valve assembly being movable between an open position when said deboost piston is in said advanced position and a closed position when said de-boost piston is in said retracted position, means defining a space in said bore in which fluid from said power source is adapted to be trapped to hold said de-boost piston in said inoperative advanced position, and a dump valve for maintaining said trapped volume of fluid in said space, said dump valve being movable in response to a skid signal from an normally closed position in which fluid is trapped in said space into an open position in which fluid is dumped from said space, and wherein restrictor means are incorporated for reducing the rate at which fluid is released from said brake on each occasion that said dump valve moves into said open position in response to a skid signal, at least at pressures above a pre-set level, wherein said restrictor means comprises a pressure-responsive member which is movable in a bore, and means for reducing the rate at which fluid is released form the brake adapted to be brought into operation by said pressure-responsive member, and wherein said pressure-responsive member comprises a spool, a spring for normally loading said spool into an open position in which a land is normally spaced from a throat in said bore in which said spool is guided to slide, an increase in pressure in said space to said pre-set level urging said land into said throat against the force of said spring to restrict the release of fluid from said space.

10. An hydraulic anti-skid braking system for vehicles for vehicles comprising a vehicle brake, a supply for operating fluid for applying said brake, skid sensing means for sensing the presence of skid conditions at said wheel during braking and thereupon to produce skid signals, a modulator assembly for modulating the supply of fluid from said supply to said brake in accordance with said skid signals, and a power source for controlling brake re-application following correction of said skid, wherein said modulator assembly comprises a housing having a bore, a de-boost piston working in said bore and movable between an advanced inoperative position and a retracted position, a control valve assembly with which said de-boost piston is adapted to co-operate and which is adapted to control communication between said brake and said supply, said control valve assembly being movable between an open position when said de-boost piston is in said advanced position and a closed position when said de-boost piston is in said retracted position, means defining a space in said bore in which fluid from said power source is adapted to be trapped to hold said de-boost piston in said inoperative advanced position, and a dump valve for maintaining said trapped volume of fluid in said space, said dump valve being movable in response to a skid signal from an normally closed position in which fluid is trapped in said space into an open position in which fluid is dumped from said space, and wherein restrictor means are incorporated for reducing the rate at which fluid is released from said brake on each occasion that said dump valve moves into said open position in response to a skid signal, at least at pressures above a pre-set level, wherein said restrictor means comprises a pressure-responsive member which is movable in a bore, and means for reducing the rate at which fluid is released form the brake adapted to be brought into operation by said pressure-responsive member, and wherein said pressure-responsive member comprises a piston, a valve member, a spring for loading said piston in one direction to hold said valve member in an open position, said piston being movable in the opposite direction in response to an increase in pressure to permit said valve member to move into a closed position, and a restrictor being provided to permit a restricted flow past said valve member when said valve member is in said closed position.

11. A braking system as claimed in claim 10, wherein said restriction comprises a restricted passage across a seating with which said valve member is engageable in the closed position.

12. A braking system as claimed in claim 10, wherein said restrictor comprises a restricted passage through said valve member.

13. A braking system as claimed in claim 10, wherein said restriction is defined by a clearance around the valve member when said valve member is in the closed position.

* * * * *